(12) United States Patent
Xin

(10) Patent No.: US 11,445,667 B2
(45) Date of Patent: Sep. 20, 2022

(54) PLANT CULTIVATION DEVICE AND GREENING APPARATUS THEREOF

(71) Applicant: SHENZHEN YAOLAN TECHNOLOGY CO., LTD., Shenzhen (CN)

(72) Inventor: Jun Xin, Nanchang (CN)

(73) Assignee: Shenzhen Yaolan Technology Co., Ltd., Shenzhen (CN)

(*) Notice: Subject to any disclaimer, the term of this patent is extended or adjusted under 35 U.S.C. 154(b) by 216 days.

(21) Appl. No.: 16/830,306

(22) Filed: Mar. 26, 2020

(65) Prior Publication Data
US 2020/0221648 A1    Jul. 16, 2020

Related U.S. Application Data

(63) Continuation of application No. PCT/CN2018/107184, filed on Sep. 25, 2018.

(30) Foreign Application Priority Data

Sep. 27, 2017   (CN) .......................... 201710889167.1

(51) Int. Cl.
*A01G 9/02*     (2018.01)
*A01G 31/00*    (2018.01)
*A01C 23/04*    (2006.01)
*A01G 9/24*     (2006.01)

(52) U.S. Cl.
CPC ............ *A01G 9/028* (2013.01); *A01C 23/042* (2013.01); *A01G 9/027* (2013.01); *A01G 9/245* (2013.01); *A01G 9/247* (2013.01)

(58) Field of Classification Search
CPC ........ A01G 9/245; A01G 9/247; A01G 9/022; A01G 9/025; A01G 9/028; A01G 9/027; A01G 31/00
See application file for complete search history.

(56) References Cited

U.S. PATENT DOCUMENTS

| | | | |
|---|---|---|---|
| 2013/0180172 A1* | 7/2013 | Silverberg | A01G 9/022 47/65 |
| 2018/0199526 A1* | 7/2018 | Guo | A01G 31/02 |
| 2021/0059139 A1* | 3/2021 | Jang | G06T 7/11 |

FOREIGN PATENT DOCUMENTS

| | | | | |
|---|---|---|---|---|
| CN | 103430791 A | | 12/2013 | |
| DE | 202010012739 U1 * | | 2/2012 | ............. A01G 31/02 |
| EP | 2441323 A1 * | | 4/2012 | ............. A01G 9/025 |
| KR | 100817912 B1 * | | 3/2008 | ............. A01G 9/025 |

* cited by examiner

*Primary Examiner* — Kristen C Hayes

(57) ABSTRACT

A plant cultivation device and a greening apparatus thereof are provided. The plant cultivation device includes a fixing member which includes a first channel, a shared channel and a plurality of first through-holes. The first through-hole is connected with the first channel and the shared channel, and passes through an upper surface of the fixing member. Both the first through-hole and the shared channel are stack-up with each other, and the first through-hole is located above the shared channel. The shared channel is configured to fill with a cultivation medium, and the first channel is configured to store water flowing from the shared channel by the first through-hole when too much water is stored in the shared channel. The present disclosure can optimize a growing environment of plants.

14 Claims, 8 Drawing Sheets

PLANT CULTIVATION DEVICE AND GREENING APPARATUS THEREOF

CROSS-REFERENCE TO RELATED APPLICATION

The present application is a continuation application of PCT patent application No. PCT/CN2018/107184, filed on Sep. 25, 2018, which is incorporated by reference in its entirety

BACKGROUND

Technical Field

The present disclosure generally relates to technologies for plant cultivation devices, and snore particularly, to a plant cultivation device and a greening apparatus thereof.

Description of Related Art

Stereo virescence is a sunrise industry supported by government policies at all levels and a hotspot of a current city ecological construction in our country, and has formed a certain scale market. In China, a series of ecological construction projects such as a green-building, a sponge-city-construction and an urban-double-repair are promoted on a large scale. In this way, a conventional stereo virescence, especially a vertical virescence technology is unable to meet a market's demand. Because the conventional stereo virescence is configured to cultivate plants via a monomer cultivation container, so that an extension and growth of plant roots is limited by a relatively narrow space of the cultivation container, thereby a state and a survival rate of the plants are greatly affected. Meanwhile, more plants are restricted to enter a field of the stereo virescence, so that it only can obtain a flat and monotonous effect of the stereo virescence.

DETAILED DESCRIPTION

Figure 1:
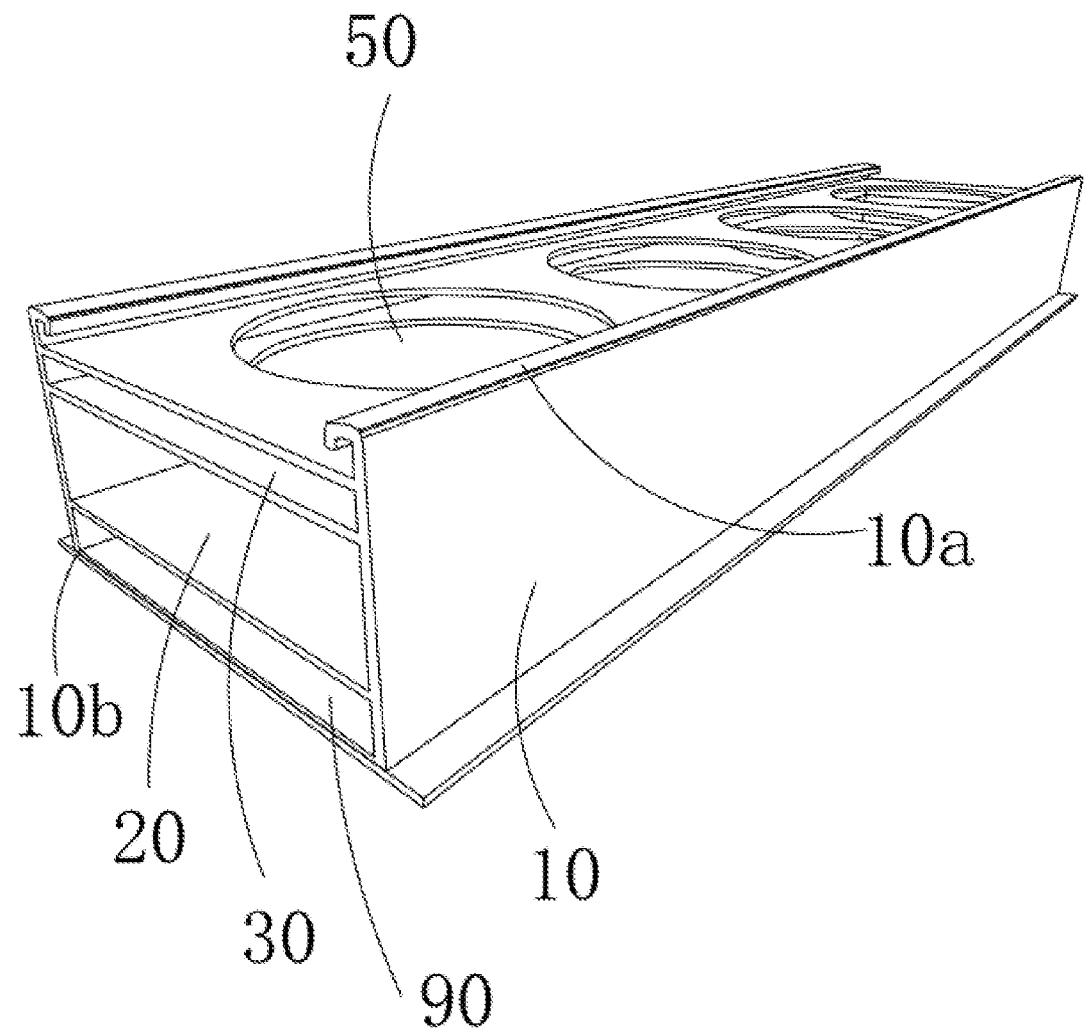
FIG. 1 is a partial schematic view of a plant cultivation device in accordance with an exemplary embodiment of the present disclosure.
Figure 2:
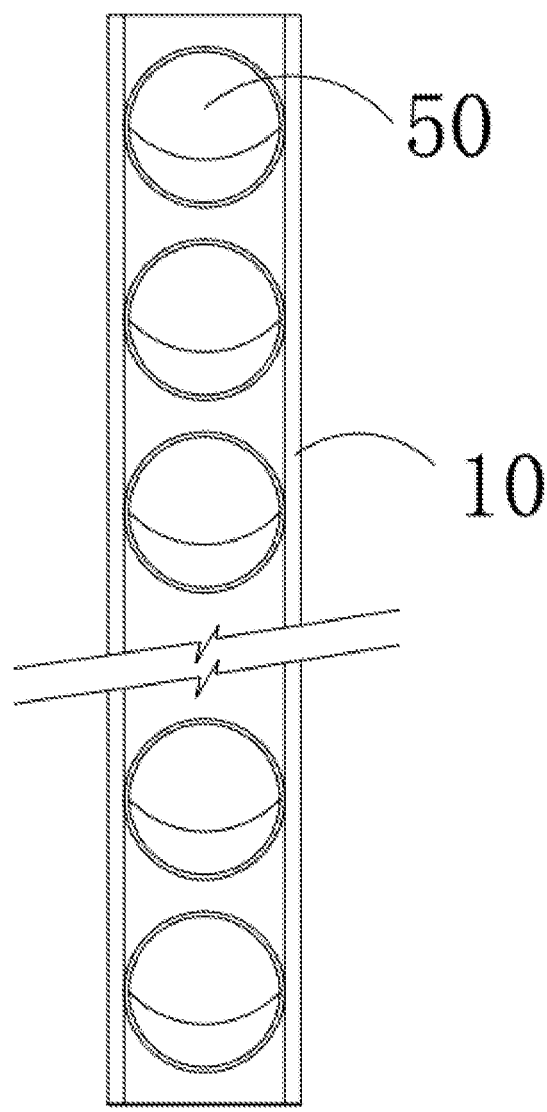
FIG. 2 is a planar view of the plant cultivation device of FIG. 1.

Embodiments of the present disclosure are described in detail below, and examples of the embodiments are shown in the accompanying drawings, in which like reference numerals throughout indicate the same or similar elements or the elements having the same o similar functions. The embodiments described below by reference to the accompanying drawings are exemplary and are intended to be used to interpret the present disclosure and not by way of limitation of the disclosure.

Referring to FIGS. 1-4, a greening apparatus of the present disclosure can be applied to a vertical elevation, a flat roof, a slope roof, an arch roof or a road greening isolation belt. The greening apparatus includes at least one plant cultivation device 100.

The plant cultivation device 100 includes a fixing member 10, a shared channel 20, a first channel 30, a plurality of first planting members 40 and a plurality of first through-holes 50. The fixing member 10 is configured to fix the greening apparatus, the shared channel 20 is configured to fill with a light cultivation medium, the first through-hole 50 extends from a top surface of the first channel 30 to the shared channel 20. The first planting member 40 is configured to cultivation plants and install on the first through-hole 50, and the first through-hole 50 is connected with the shared channel 20, the first channel 30 and the first planting member 40, so that roots of the plants can grow together in the shared channel 20.

It should be noted that, in an actual production and processing process, the light cultivation medium can be filled in the shared channel 20 when the plant cultivation device 100 is cultivating the plants, rather than first filling the light cultivation medium in the shared channel 20. Of course, the light cultivation medium can be also filled within shared channel 20 before cultivating the plants in the plant cultivation device 100. A right time point can be chosen to fill the light cultivation medium within the shared channel 20 according to an actual requirement.

Understandably, the fixed member 10 can have a plurality of plate-like structures to form the shared channel 20 and the first channel 30. Such as the fixing member 10 includes two side plates to respectively form a sidewall of the shared channel 20 and a sidewall of the first channel 30. The fixing member 10 can also include an upper plate, a middle plate and a lower plate. All the upper plate, the middle plate and the lower plate are stack-up with each other in sequence and arranged at intervals to fix with the two side plates so as to form the shared channel 20 and the first channel 30. In this way, the shared channel 20 is stack-up with the first channel 30. In an embodiment of the present disclosure, the first channel 30 can be arranged above the shared channel 20. It can be understood that h first channel 30 is positioned above the shared channel 20 when the plant cultivation device 100 is in a plant cultivation state.

Furthermore, a width of the first channel 30 can be same as a width of the shared channel 20. It can be understood he width of the first channel 30 can be different from the width of the shared channel 20. In some embodiments of he present disclosure, a depth of the shared channel 20 can be greater than a depth of the first channel 30.

In an embodiment of the present disclosure, the fixing member 10 can include the through-hole arranged on both the upper plate and the middle plate so as to form the first through-hole 50. The first through-hole 50 can connect with the first channel 30 and the shared channel 20. The first planting member 40 is received in the first through-hole 50 to limit a position of a plant so that e plant can be rooted in the shared channel 20.

In an embodiment of the present disclosure, by providing the shared channel 20, all roots of the plant can be rooted in a same channel, so that plants with developed roots, plants with higher growth environments and plants with different needs can share a same space, nutrients and water, so as to meet different needs of different plants, which can greatly improve the survival ate of cultivation plants, reduce the cost of the cultivation plants, and solve the problem of a difficult irrigation in current technologies. At the same time, more plants can be cultivated in the greening apparatus of the present disclosure, which can enrich the varieties of the cultivation plants and solve the problem of flat and monotonous plant varieties caused by the relatively narrow space of the cultivation container in the conventional technology. That is to say, the greening apparatus of the present disclosure can provide a full spreading environment for roots of the plant by providing the shared channel, thereby the survival rate of the plant can be greatly improved.

In an embodiment of the present disclosure, water and nutrient solutions needed by the plants can be directly guided into the shared channel 20. Furthermore, a rainwater pipe or a tap water pipe can be directly connected to the shared channel 20.

Because the water and the nutrient solutions of the present disclosure is directly imported into the shared channel 20, so that the loss of the water and the nutrient solutions can be reduced, and the problem of difficult irrigation can be further solved. At the same time, the rainwater pipe can be directly connected with the shared chancel 20, by using rainwater for irrigation, so that the cost of irrigation can be reduced and the purpose of water conservation can be obtained. In this way, it can solve the problems of complex green irrigation system, uneven water supply and difficult maintenance to realize rainwater irrigation, which is a practical technology for the sponge-city-construction.

Furthermore, during using the plant cultivation device 100, excessive water in the shared channel 20 can flow into the first channel 30 through the first through-hole 50 so as to prevent the excessive water from affecting growth of the plants for further reducing the irrigation difficulty.

In an embodiment of the present disclosure, fruits and vegetables can be grown in the first planting member 40. For example, the fruits and the vegetables can be grown on a balcony or on a roof by using the plant cultivation device 100 of the present disclosure.

In an embodiment of the present disclosure, a length of the plant cultivation device 100 is about 6-10 meters. In other embodiments of the present disclosure, the length of plant cultivation device 100 can be changed according to an actual requirement.

Furthermore, except the first planting member 40, other structures of the plant cultivation device 100 of the present disclosure are integral, that is, all the fixing member 10, the shared channel 20, the first channel 30 and the first channel 50 are integral together, so that the plant cultivation device 100 can be large-scale industrially produced to reduce workload of manual work and manufacture cost. It can be also understood that the fixing member 10 is an integral configuration to form the shared channel 20, the first channel 30 and the plurality of first through-holes 50. Furthermore, e first planting member 40 and the fixing member 10 can he separated from each other. When the plant is needed to be replaced, it is only needed to replace the first planting member 40 rather than replacing the other structures. In this way, the workload and the loss can be reduced, and the loss caused by the current technology that requires to replace a whole plant cultivation device 100 due to plant blight can also be avoided.

In an embodiment of the present disclosure, a cross section of the bottom of the first planting member 40 can be roughly the same as a cross section of the bottom of the first through-hole 50. For example, when the cross section of the bottom of the first through-hole 50 is circular, the cross section of the bottom of the first planting member 40 is also circular. For another example, when the cross section of the first through-hole 50 is square, the cross section of the bottom of the first planting member 40 is also square, so as to conveniently install the first planting member 40 in the first through-hole 50. Furthermore, the first planting member 40 can be rotated relative to the first through-hole 50 to adjust a cultivation direction of the plants in the first planting member 40 to be suitable for various applications.

Figure 4:
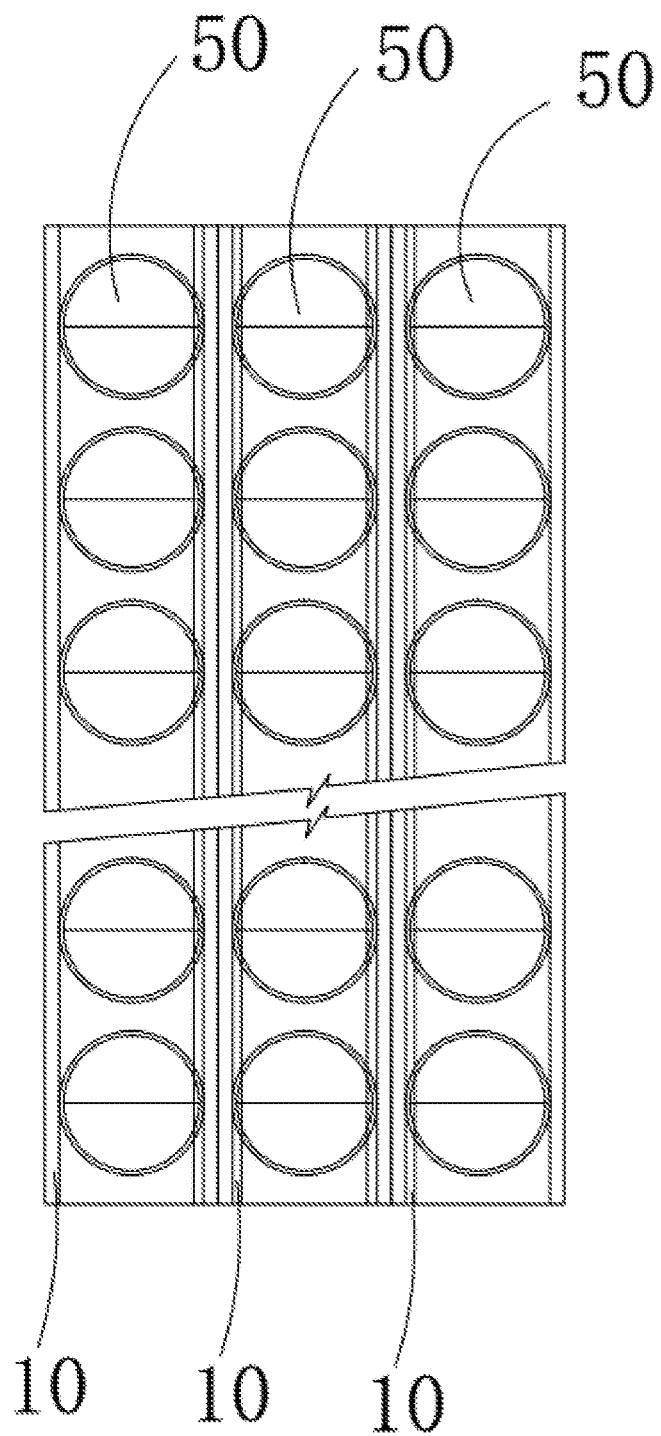
FIG. 4 is a planar assembly view of a plurality of plant cultivation devices.

In an embodiment of the present disclosure, the greening apparatus of the present disclosure can include a plurality of plant cultivation devices 100 (referring to FIG. 4). When needing a large area of virescence, it is only needed to arrange a plurality of plant cultivation devices 100 in rows and rows on where the virescence is needed to he positioned, by machine operation and industrialization, so as to reduce the labor intensity of manual operation and the manufacture cost.

In an embodiment of the present disclosure, by using an integrated molding technology, two rows or more than two rows of plant cultivation devices 100 can be directly produced, and the number of rows of the plant cultivation devices 100 can be changed according to actual requirements.

Figure 5:
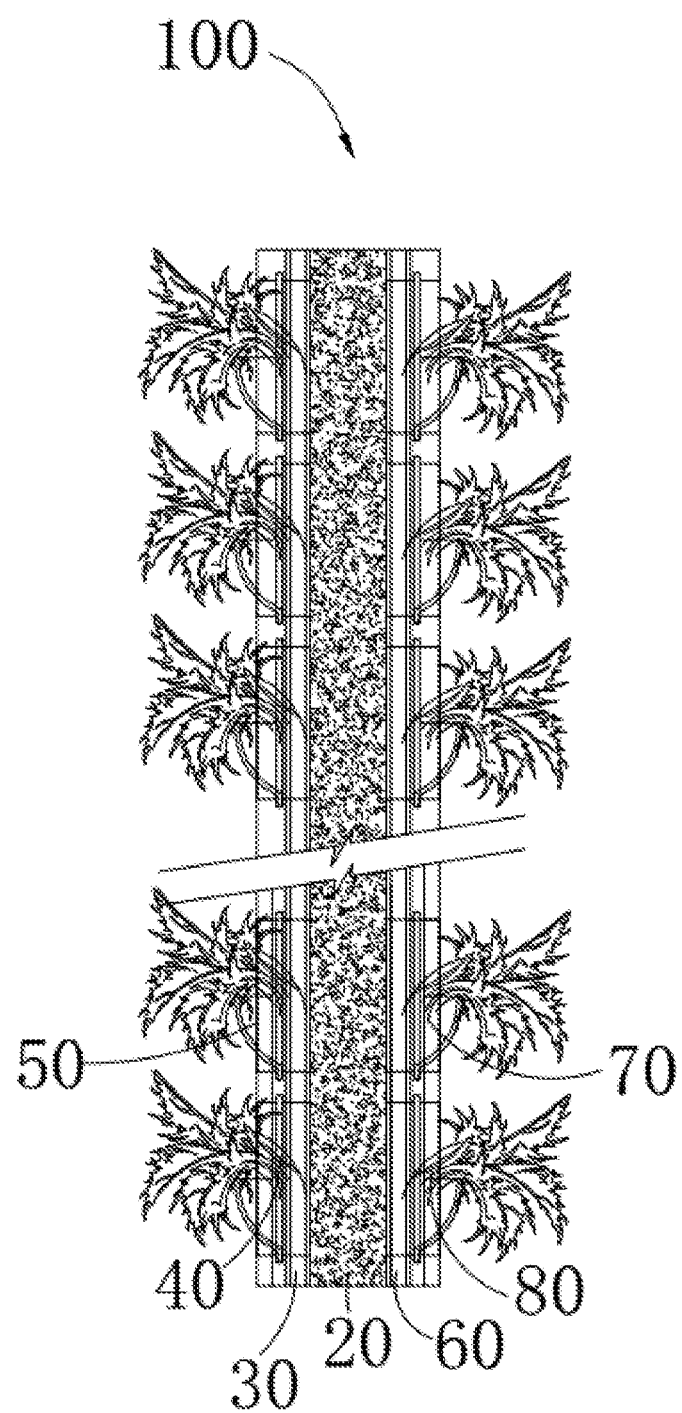
FIG. 5 is similar to FIG. 3, but showing on a double sides planting state.

Referring to FIG. 5, the fixing member 10 further includes a second channel 60, a plurality of second planting members 70 and a plurality of second through-holes 80. The second through-hole 80 extends from a top surface of the second channel 60 to the shared channel 20. The second planting member 70 is configured to cultivate plants and install on the second through-hole 80, and the second through-hole 80 is connected with the second planting member 70, the second channel 60 and the shared channel 20, so that roots of h plants can grow together in the shared channel 20.

Because the planting members are provided on two sides of the shared channel 20 of the present disclosure, that is, the plants are grown on both sides of the shared channel 20. Such planting method is especially suitable for a green belt in the middle of the road. In a usage process, the plant cultivation device 100 can be installed in one-time only according to design specifications of the assembly, rather than manually installing the plant cultivation device 100 one by one on the road back and forth, which can greatly reduce manual work and accidental damage of workers on the road.

In an embodiment of the present disclosure, the structure and function of the second channel 60 is same as the first channel 30, and the structure of the second planting member 70 is same as or similar to the first planting member 40. The structure and functions of the second through-hole 80 is same as the first through-hole 50.

In an embodiment of the present disclosure, a cross section of the bottom of the second planting member 70 can be roughly the same as a cross section of the bottom of the second through-hole 80. For example, when the cross section of the bottom of the second through-hole 80 is circular, the cross section of the bottom of the second planting member 70 is also circular. For another example, when the cross section of the second through-hole 80 is square, the cross section of the bottom of the second planting member 70 is also square, so as to conveniently install he second planting member 70 in the second through-hole 80.

Figure 3:
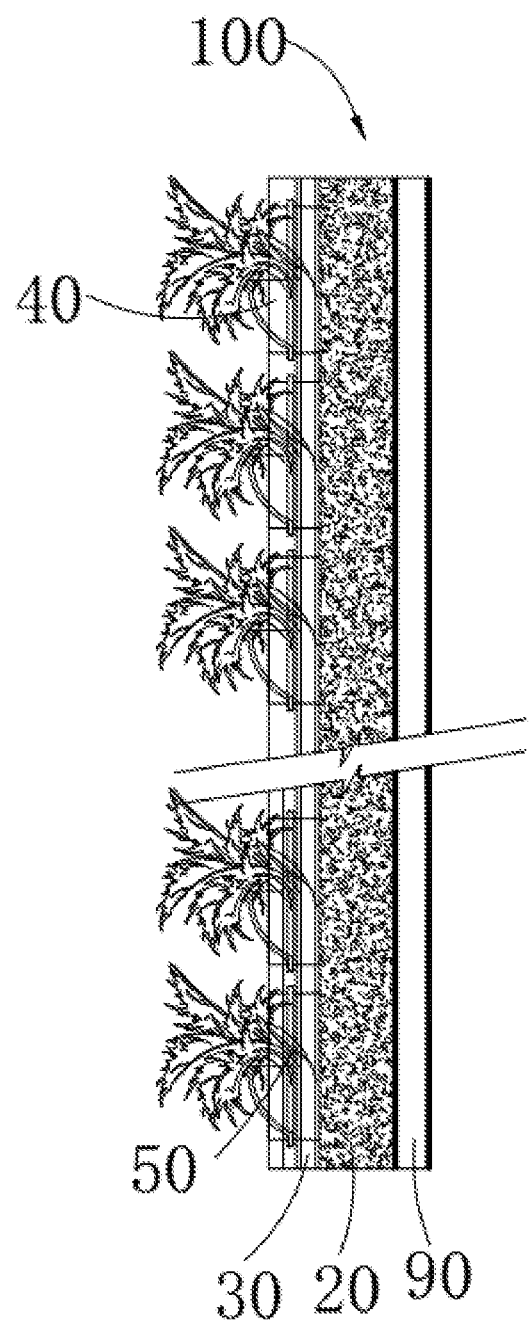
FIG. 3 is a schematic view of the plant cultivation device of FIG. 1, showing on a single side planting state.

Referring to FIG. 1 and FIG. 3, the plant cultivation device 100 further includes an alternate third channel 90 isolated from the shared channel 20 along a longitudinal direction of the third channel 90. All the third channel 90, the shared channel 20 and the first channel 30 are stack-up with each other in sequence. It can be understood hat, when the plant cultivation device 100 is in a state of the plant cultivation, the third channel 90 is located at he bottom of the plant cultivation device 100, and the shared channel 20 is located between the first channel 30 and the third channel 90. In an embodiment of the present disclosure, the fixing member 10 can further include a bottom plate. All the bottom plate, the lower plate, the muddle plate and the upper plate are stack-up with each other in sequence and arranged at intervals to fix with the two side plates so as to form the first channel 30, the shared channel 20 and the third channel 90. Furthermore, the first through-hole 50 isn't connected with the third channel 90. It can be understood that none through-hole is arranged in the lower plate to isolate the third channel 90 from the shared channel 20.

Furthermore, a width of the third channel 90 can he equal o a width of the shared channel 20. It can be understood that the width of the third channel 90 can he different from the width of the shared channel 20. In some embodiments of the present disclosure, a depth of the shared channel 20 can be greater than a depth of the third channel 90.

In an embodiment of the present disclosure, the third channel 90 is a standby channel, that is to say, users can decide whether to design the third channel 90 according to their own needs, or whether to set up the third channel 90 according to different usage environments. In cold weather, circulating hot water can be added to the third channel 90 to heat the shared channel 20, so that the roots of the plants rooted in the shared channel 20 can't be frozen and the cultivation medium of the plants filled in the shared channel 20 can't also be frozen into the frozen ground. Therefore, the plants grown in the planting member can be survived in the cold environment, which can solve a serious waste problem caused in the conventional technology that the cultivating plants can't be survived in the cold weather so as to need to replace all the virescence.

Figure 6:
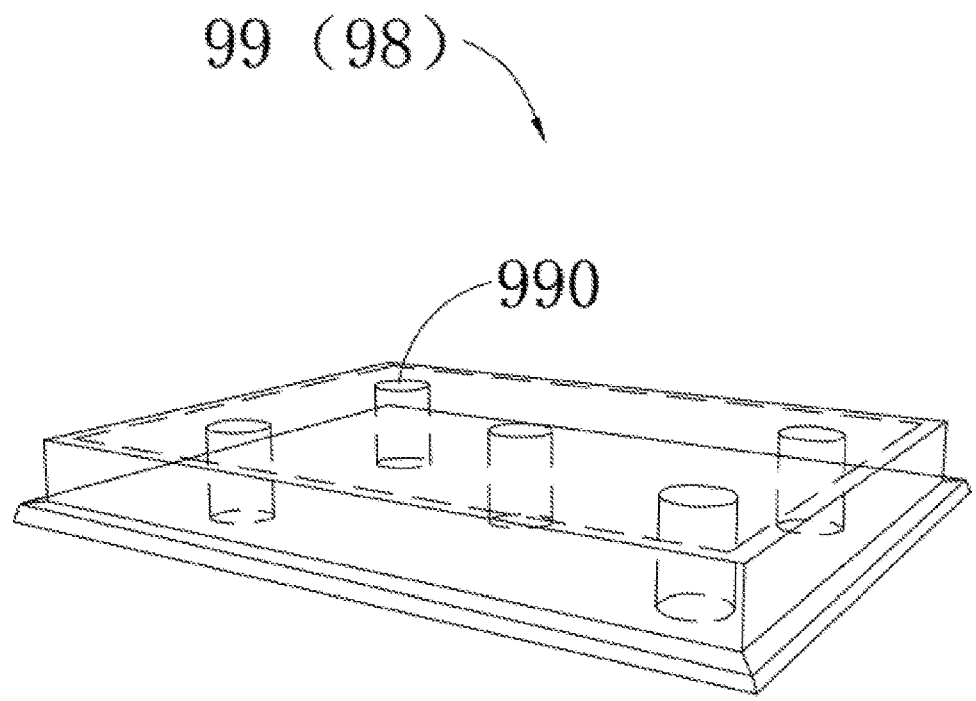
FIG. 6 is a schematic view of an upper cover or a lower cover of the plant cultivation device of FIG. 1.

Referring to FIG. 1 and. FIG. 6, the plant cultivation device 100 further include an upper cover 99 positioned on an upper end 10a of the fixing member 10 and connected with an irrigation pipe, and a lower cover 98 positioned on a lower end 10b of the fixing member 10 and connected with a drain-pipe. The upper cover 99 is connected with a top portion of the first channel 30 and an upper portion of the second channel 60, and e lower cover 98 is connected with a bottom portion of the first channel 30 and a lower portion of the second channel 60. Excessive water for irrigation can flow into the drain-pipe through the first channel 30, the second channel 60 and the lower cover 98.

During in an irrigation process, the excessive water from the shared channel 20 can flow out through the lower cover 98 and the drain-pipe, and excessive rain water can also flow out through the lower cover 98 and the drain-pipe. In this way, it is more convenient to collect the excessive water, further save water and protect the environment.

In an embodiment of the present disclosure, each of the upper cover 99 and the lower cover 98 includes a through-hole 990 provided for irrigation and drainage.

In an embodiment of the present disclosure, the structure of the upper cover 99 is same as the lower cover 98.

Furthermore, a top end of the shared channel 20 is connected with the upper cover 99, and a bottom end of the shared channel 20 is connected with the lower cover 98. During the irrigation process, the water and nutrient solutions can be directly guided into he shared channel 20 by the upper cover 99. During in the usage process, the excessive water in the shared channel 20 can flow into the first channel 30 by the first rough-hole 50, or and flow into the second channel 60 by the second through-hole 80.

It can be noted that the upper cover 99 and the lower cover 98 of the present disclosure can connect with the fixing member 10 which only includes the first channel 30 without the second channel 60. For example,the upper cover 99 is installed on the upper end 10a of the fixing member 10 and connected v e irrigation pipe, and the lower cover 98 is installed on the lower end 10b of the fixing member 10 and connected with the drain-pipe. The upper cover 99 is connected with the top portion of the first channel 30, and the lower cover 98 is connected with the bottom portion of the first channel 30. Thus, the excessive irrigation water in the shared channel 2 can flow into the first channel 30 by the first through-hole 50, and then flow into the drain-pipe by the first channel 30 and the lower cover 98 in turn to achieve the drainage function.

Figure 7:
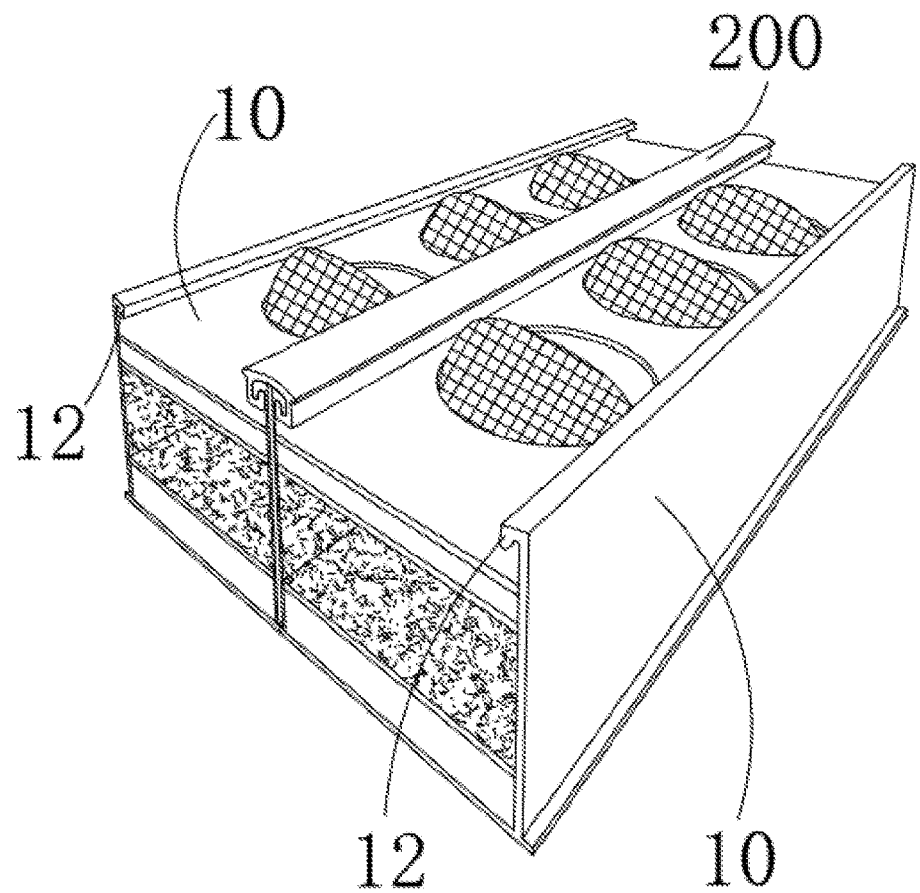
FIG. 7 is a schematic view of two adjacent cultivation devices connected with each other by a connecting member.
Figure 8:
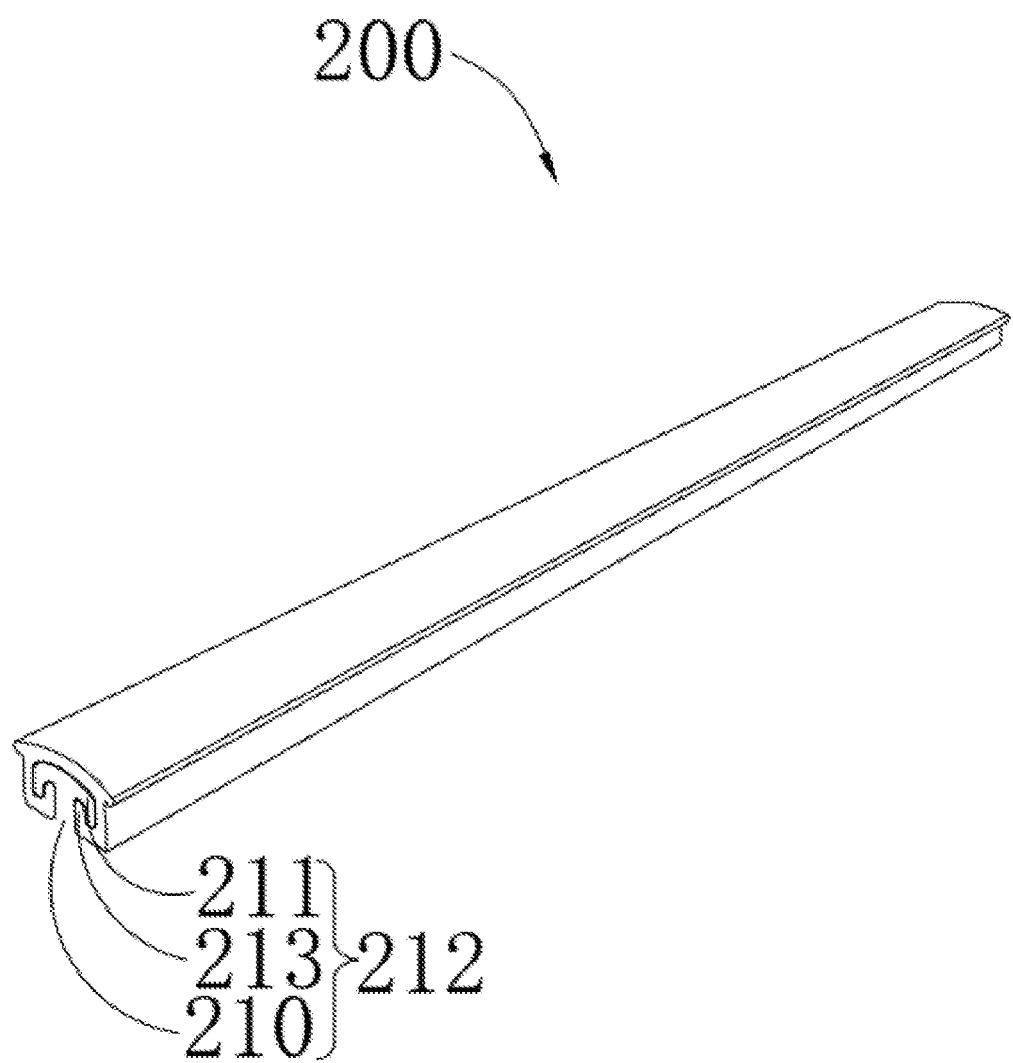
FIG. 8 is a schematic view of the connecting member of FIG. 7.
Figure 9:
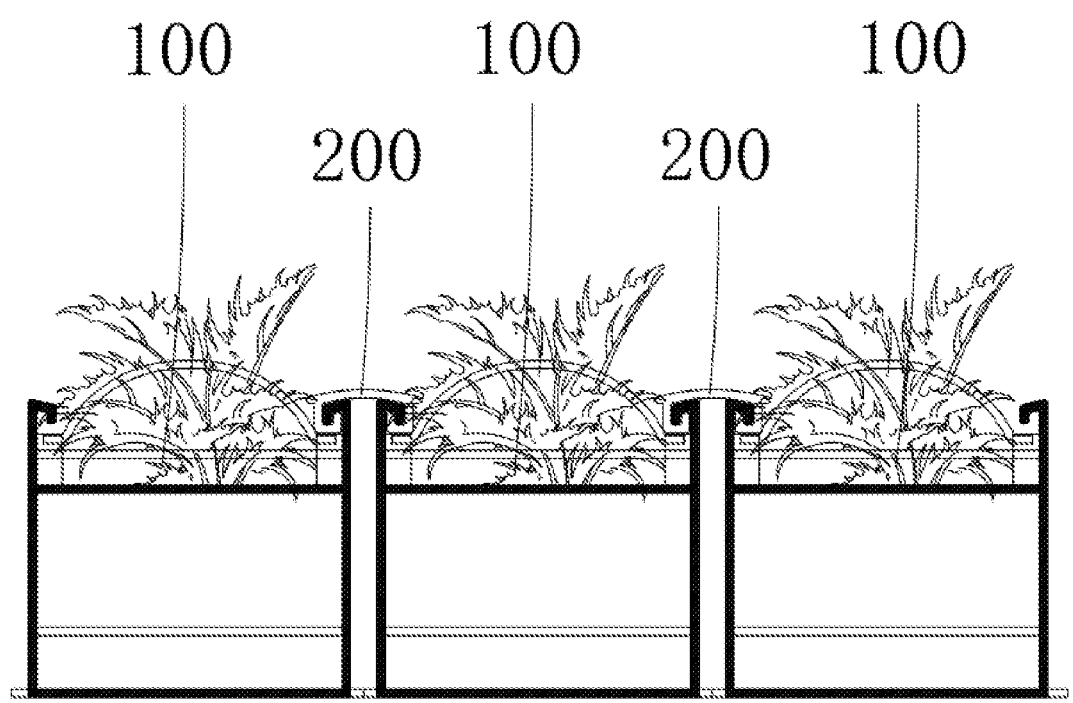
FIG. 9 is a cross-sectional view of the plant cultivation device of FIG. 7, showing on planted plants.

Referring to FIGS. 7-9, the greening apparatus further includes a connecting member 200 configured to connect two adjacent plant cultivation devices 100.

In an embodiment of the present disclosure, a cross section of the connecting member 200 is circular-arc, that is, the connecting member 200 is high in its middle and low on its both sides. That is to say, the connecting member 200 includes an arch top so that the water can flow into the plant cultivation device 100 arranged on both sides of the connecting member 200, during greening a flat roof, a slope roof and an arched roof.

The plant cultivation devices 100 connected with each other by the connecting member 200 is suitable for the roof of a building. When the plants of the plant cultivation device 100 are grown up, the entire roof is covered with the plants, and the connecting member 200 is also covered with the plants. In this way, the whole roof is covered with the plants, so that the roof can not only be beautiful, but also be insulated by the plants.

Since the connecting member 200 is curved, with high in the middle and low on both sides, the rainwater can flow into the plant cultivation device 100 through a lower part formed on both sides of the connecting member 200 to irrigate the plants.

Furthermore, the fixing member 10 further includes a clasp 12 respectively formed on two sides of the upper end 10a thereof, and the connecting member 200 includes a clamping room 212 so that the clasps 12 of each two adjacent fixing members 10 can respectively clamp into a corresponding portion of the clamping room 212 so as to connect the two adjacent fixing members 10 together. During installing the fixing member 10, all fixing members 10 can be assembled into a whole assembly by simply clamping the clasps 12 into the clamping room 212. While, when disassembling the fixing member 10, all fixing members 10 can be removed by simply detaching the clasps 12 from the clamping room 212. That is to say, an installation or a disassembly of the fixing members 10 of the present disclosure can be finished without using any tools, which can be conveniently used and labor intensity can be reduced.

Furthermore, the clamping room 212 includes a first hole 210, a second hole 211 and a pair of resisting portions 213. The first hole 210 is arranged between the pair of resisting portions 213, and the clasp 12 can enter the second hole 211 via the first hole 210 and then clamp between the resisting portion 213 and an inner wall of the second hole 211.

Because the clasp 12 is clamped between the resisting portion 213 and the inner wall of the second hole 211, during in the usage process, the clasp 12 is difficult to detach from the clamping room 212 accidentally, thereby an accidental disconnection between the fixing member 10 and the connecting member 200 can be prevented so as to improve the usage safety and reliability.

Because all of the fixing member 10, the shared channel 20, the first channel 30 and the plurality of first through-holes 50 of the present disclosure are integrated together. During using he plant cultivation device 100, it is only needed to install the first planting member 40 in the first through-hole 50, which can improve the usage convenience, reduce manual operation time and the labor intensity. Meanwhile, the first planting member 40 can be optionally replaced to easily replace the plant varieties without needing to replace the whole plant cultivation device 100, which can avoid the waste and reduce the cost and is conducive to environmental protection.

Furthermore, the plant cultivation device 100 of the present disclosure can be cultivated either on one side (shown in FIG. 3) or on two sides (shown in FIG. 5) thereof, which can be applied to different conditions, and improve the usage generality. At the same time, the greening apparatus of the present disclosure can either use a single plant cultivation device 100 or a plurality of plant cultivation devices 100, which can further improve the usage convenience and generality.

Although embodiments of the present disclosure have been shown and described above, it can be understood that the above embodiments are exemplary and not by way of limitation of the disclosure, one of ordinary skill in the related art may, within a protection scope of the present disclosure, change, modify, replace or alter the aforementioned embodiments without deviating from the principle and purpose of the disclosure.

What is claimed is:

1. A plant cultivation device comprising:
a fixing member comprising a first channel, a shared channel and a plurality of first through-holes, the first through-hole connected with the first channel and the shared channel and passing through an upper surface of the fixing member; the first channel being stack-up with the shared channel and located above the shared channel; and wherein
the shared channel is configured to fill with a cultivation medium, and the first channel is configured to store water flowing from the shared channel by the first through-hole when too much water is stored in the shared channel;
the plant cultivation device further comprises an upper cover positioned on an upper end of the fixing member and connected with an irrigation pipe, and a lower cover positioned on a lower end of the fixing member and connected with a drain-pipe.

2. The plant cultivation device as claimed in claim 1, wherein the fixing member is an integral configuration to form the first channel, the shared channel and the plurality of first through-holes.

3. The plant cultivation device as claimed in claim 1, wherein the upper cover is connected with a top portion of the first channel, and the lower cover is connected with a bottom portion of the first channel, excessive water for irrigation flowing into the drain-pipe through the first channel and the lower cover.

4. The plant cultivation device as claimed in claim 3, wherein a top end of the shared channel is connected with the upper cover so that water and nutrient solutions in the irrigation pipe is directly guided into the shared channel by the upper cover, and a bottom end of the shared channel is connected with the lower cover.

5. The plant cultivation device as claimed in claim 1, wherein the fixing member further comprises a second channel and a plurality of second through-holes, the second through-hole connected with the second channel and the shared channel and passing through the upper surface of the fixing member;
the second channel being stack-up with the shared channel and located above the shared channel; the second channel configured to store the water flowing from the shared channel by the second through-hole when too much water is stored in the shared channel, the first channel and the second channel arranged on two sides of the shared channel.

6. The plant cultivation device as claimed in claim 5, wherein the fixing member is an integral configuration to form the first channel, the second channel, the shared channel, and the plurality of first and second through-holes.

7. The plant cultivation device as claimed in claim 5, wherein the plant cultivation device further comprises an upper cover positioned on an upper end of the fixing member and connected with an irrigation pipe, and a lower cover positioned on a lower end of the fixing member and connected with a drain-pipe.

8. The plant cultivation device as claimed in claim 7, wherein the upper cover is connected with a top portion of the first channel and an upper portion of the second channel, and the lower cover is connected with a bottom portion of the first channel and a lower portion of the second channel, excessive water for irrigation flowing into the drain-pipe through the first channel, the second channel and the lower cover.

9. The plant cultivation device as claimed in claim 7, wherein a top end of the shared channel is connected with the upper cover so that water and nutrient solutions in the irrigation pipe is directly guided into the shared channel by the upper cover, and a bottom end of the shared channel is connected with the lower cover.

10. A greening apparatus configured to cultivate plants on a roof and comprising at least two plant cultivation devices and a connecting member, the connecting member configured to connect with two adjacent plant cultivation devices;
each plant cultivation device comprising at least two fixing members, the fixing member comprising a first channel, a shared channel and a plurality of first through-holes, the first through-hole connected with the first channel and the shared channel, and passing through an upper surface of the fixing member; the first channel being stack-up with the shared channel and located above the shared channel; and wherein
the shared channel is configured to fill with a cultivation medium, and the first channel is configured to store water flowing from the shared channel by the first through-hole when too much water is stored in the shared channel;
wherein the connecting member comprises an arch top so that rainwater can flow into the plant cultivation device arranged on both sides of the connecting member.

11. The greening apparatus as claimed in claim 10, wherein the fixing member further comprises a clasp respectively formed on two sides of an upper end thereof, and the connecting member comprises a clamping room so that the clasps of each two adjacent fixing members can respectively clamp into a corresponding portion of the clamping room so as to connect the two adjacent fixing members together.

12. The greening apparatus as claimed in claim 11, wherein the clamping room comprises a first hole, a second hole and a pair of resisting portions, the first hole arranged between the pair of resisting portions, and the clasp entering the second hole via the first hole and clamped between the resisting portion and an inner wall of the second hole.

13. The greening apparatus as claimed in claim 12, wherein the plant cultivation device further comprises an upper cover positioned on the upper end of the fixing member and connected with an irrigation pipe, and a lower cover positioned on a lower end of the fixing member and connected with a drain-pipe, the upper cover connected with a top portion of the first channel, and the lower cover connected with a bottom portion of the first channel, excessive water for irrigation flowing into the drain-pipe through the first channel and the lower cover.

14. The greening apparatus as claimed in claim 13, wherein a top end of the shared channel is connected with the upper cover so that water and nutrient solutions in the irrigation pipe is directly guided into the shared channel by the upper cover, and a bottom end of the shared channel is connected with the lower cover.

\* \* \* \* \*